United States Patent [19]
Madhavapeddy et al.

[11] Patent Number: 5,875,400
[45] Date of Patent: *Feb. 23, 1999

[54] CELLULAR MOBILE COMMUNICATIONS SYSTEM

[75] Inventors: Seshagiri Rao Madhavapeddy, Richardson; Kalyan Basu, Plano; Allison V. Roberts; Michael John McCarthy, both of Dallas; Russell David Balcom, Rowlett; Lance Miquel LaBauve, Plano, all of Tex.

[73] Assignee: Northern Telecom Limited, Montreal, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 423,739

[22] Filed: Apr. 18, 1995

[51] Int. Cl.⁶ ..................................................... H04Q 7/38
[52] U.S. Cl. ........................................... 455/458; 455/435
[58] Field of Search ................................ 379/57, 58, 59, 379/60; 455/33.1, 33.2, 56.1, 458, 435, 445, 567, 422, 550, 432, 456

[56] References Cited

U.S. PATENT DOCUMENTS

| | | | |
|---|---|---|---|
| 4,876,738 | 10/1989 | Selby | 455/433 |
| 5,153,902 | 10/1992 | Buhl et al. | 379/57 |
| 5,278,890 | 1/1994 | Beeson, Jr. et al. | 455/458 |
| 5,369,681 | 11/1994 | Boudreau et al. | 379/59 X |
| 5,408,683 | 4/1995 | Ablay et al. | 455/435 |
| 5,533,094 | 7/1996 | Sanmugam | 379/57 |
| 5,548,816 | 8/1996 | DeVaney | 379/59 X |

*Primary Examiner*—Dwayne D. Bost
*Assistant Examiner*—William G. Trost
*Attorney, Agent, or Firm*—Lee, Mann, Smith, McWilliams, Sweeney & Ohlson

[57] ABSTRACT

In a cellular mobile access communications system each mobile terminal registers its location at intervals. From the registration history of each mobile, a probable group of cells within which a mobile terminal may be located is predicted. When a mobile is to be paged, the paging message is transmitted to the predicted cell group. If no response is received from the terminal, the page message is then broadcast to further system cells. This reduces the overall paging load on the system.

11 Claims, 4 Drawing Sheets

LOCATION ACCURACY MATRIX

Probability of Finding Mobile in Cell No.

| Last Known Cell No. | 21 | 22 | 23 | 24 | 25 | 26 | 27 | 28 | 29 | | | Y |
|---|---|---|---|---|---|---|---|---|---|---|---|---|
| 21 | 25% | 18% | 16% | 13% | 12% | 5% | 1% | .. | .. | | | |
| 22 | 20% | 15% | .. | .. | .. | .. | .. | .. | .. | | | |
| 23 | .. | | | | | | | | | | | |
| 24 | .. | | | | | | | | | | | |
| X | | | | | | | | | | | | |

LOCATION ACCURACY MATRIX

Probability of Finding Mobile in Cell No.

| Last Known Cell No. | 21 | 22 | 23 | 24 | 25 | 26 | 27 | 28 | 29 | | Y |
|---|---|---|---|---|---|---|---|---|---|---|---|
| 21 | 25% | 18% | 16% | 13% | 12% | 5% | 1% | | | | |
| 22 | 20% | 15% | | | | | | | | | |
| 23 | | | | | | | | | | | |
| 24 | | | | | | | | | | | |
| ⋮ | | | | | | | | | | | |
| X | | | | | | | | | | | |
| | | | | | | | | | | | |

Fig.3

CELLULAR MOBILE COMMUNICATIONS SYSTEM

This invention relates to mobile communications systems, and in particular to a method and apparatus for paging subscribers in such a system.

BACKGROUND OF THE INVENTION

Since the introduction of cellular communications services, the industry has experienced a rapid growth both in the area serviced and in the number of subscribers. Currently, in metropolitan areas of North America, networks of mobile switching centres (MSCs) each servicing over 100,000 call attempts per busy hour are becoming common. Each of these mobile switching centres services a network typically of over 100 cells and normally keeps track of the mobiles currently operating in its service area (SA) via a data base commonly referred to as a visitor location register (VLR). The visitor location register stores information regarding the services available to each subscriber, his home mobile switching centre and the current status (e.g. active or inactive) of the mobile. However the mobile switching centre does not as a matter of routine have accurate information regarding the precise geographical location of the mobiles. Consequently, when it is required to set up a call to a mobile, a page must be broadcast over the forward control channels (FOCCs), also known as the paging and access channels (PACH), to all the cells in the service area of the mobile switching centre. When the mobile responds to the page message the particular cell containing the mobile is then identified from the reverse control channel used for the mobile response and the call can be set up. If no response to the page is received it is assumed that the mobile is currently inactive and the call is treated accordingly.

Since, as discussed above, each mobile switching centre may serve a system of over 100 cells, in order to broadcast a page message over the forward control channels of all the cells in that system, the message is replicated into a corresponding number of copies by the mobile switching centre. As any response to the page will be received from only one cell there is a high degree of inbuilt redundancy in this method of system wide paging. The necessary message replication in the mobile switching centre is real time intensive thus reducing its call processing capacity.

One approach to this problem is to partition the cellular system into location areas which are considerably smaller than the typical service area of a mobile switching centre. Every time a mobile leaves one location area and enters another it registers a location update. The location area from which the mobile registered is recorded by the visitor location register so that, when the mobile is to be paged, the paging message is broadcast only to the cells of that location area. It will be appreciated that a reduction of the number of cells to be paged results in a corresponding reduction in the replication of the paging message. However there is also a consequent increase in registration activity in the mobile switching centre so that, although the system can be engineered to optimise the location area size so as to minimise the workload of the mobile switching centre, the improvement achievable by this technique is limited.

In one development of the above technique, the service area is partitioned into registration zones by broadcasting offsetting registration signals (REGIDs) in the different registration zones. For analogue mobiles the frequency of autonomous registration within a cellular system can be controlled via the overhead message train (OMT). Thus, if two adjacent cells belonging to different registration zones are broadcasting REGIDs that differ by a value equivalent to REGINCR this will prompt registration by the mobile whenever it moves from one cell to the other. The technique of setting up registration zones introduces a new problem associated with the re-scan process. Analogue mobiles re-scan the dedicated control channel set and lock on to the strongest channel immediately preceding the transmission of a registration message and also immediately following receipt of a registration acknowledgement message. In the circumstance where a mobile moves from a first cell in a first registration zone to a second cell in a second registration zone, it re-scans the channel set on crossing the cell boundary and locks on to the control channel of the second cell. The mobile immediately receives the overhead message train along with the registration information with the offsetting REGID prompting the mobile to register in the second cell. However, before the mobile transmits its registration message, it re-scans the control channel set and, because it is on the cell boundary, could (incorrectly) lock on to the control channel of the first cell thus transmitting the registration message over the reverse control channel of that cell. After receipt of the acknowledgement over the forward control channel of the first cell, the mobile may again lock on to the second cell, but will not register again because its memory registers have already been updated with the registration information received over the overhead message train of the second cell. Thus, although the mobile registered on crossing the cell boundary, the registration took place in the first zone instead of the second, and the information stored by the mobile switching centre regarding the location of the mobile is incorrect. This results in the paging message being broadcast in the wrong registration zone or location area with consequent failure of the attempt to set up a call.

OBJECT OF THE INVENTION

The object of the invention is to minimise or to overcome the above disadvantages.

It is a further object of the invention to provide an improved method of and apparatus for paging a mobile subscriber in a cellular communications system.

SUMMARY OF THE INVENTION

According to one aspect of the invention there is provided a method of paging a mobile terminal in a cellular communications system, the method comprising recording the location of each mobile terminal at intervals, predicting from said location recordal a probable group of cells within which a mobile terminal is likely to be located, transmitting a first paging message for a said mobile terminal to the cells comprising the predicted group for that mobile terminal, and transmitting a repeat paging message to further system cells if and only if no response is received from the mobile terminal to the first paging message.

In another aspect, the invention provides a cellular mobile communications system, comprising a plurality of cells each arranged to serve mobile terminals located in that cell, means for periodically recording the cell location of each said mobile terminal, means for predicting from said location recordal a probable group of cells within which a said mobile terminal to be paged will be located, means for transmitting a first paging message for that mobile terminal to said predicted group of cells, and means for transmitting a repeat paging message to further system cells if no response is received from the mobile terminal to the first paging message.

The invention comprises a method of and apparatus for paging mobiles in a cellular communications system in which the mobiles are tracked by using frequent fixed interval registration in combination with a paging protocol which, initially, pages only those cells that are likely to contain the mobile and only pages the rest of the system cells if no page response has been received. The cells to be paged are determined from aggregate data relating to the mobile page responses whereby the probability of locating a mobile in any system cell at the time of paging is computed. The invention thus comprises determining a set of cells wherein there is a significant probability of finding the mobile to be paged and, initially, paging only those cells.

BRIEF DESCRIPTION OF THE DRAWINGS

Embodiments of the invention will now be described with reference to the accompanying drawings in which.

DESCRIPTION OF PREFERRED EMBODIMENTS

Figure 1:
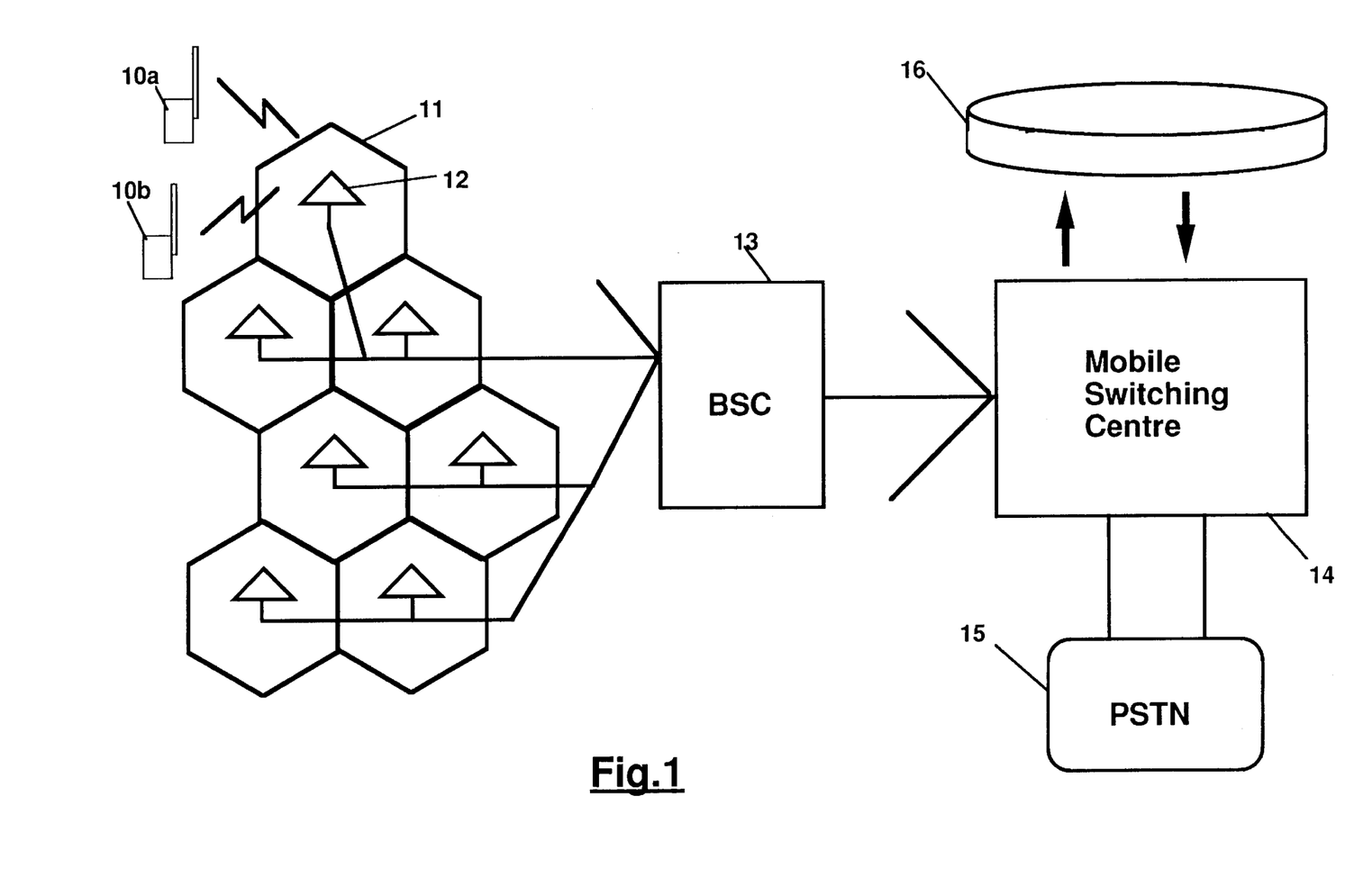
FIG. 1 is a schematic diagram of part of a mobile cellular communications system.

Referring to FIG. 1, there is depicted in highly schematic form part of a mobile cellular communications network or system. The service area of the system is subdivided into a plurality of contiguous cells 11 in each of which mobiles 10a, 10b are serviced via a respective base station 12. Operation of a group of base stations 12 is controlled via a base station controller 13 and, in turn, a number of base station controllers are serviced by a mobile switching centre 14 which may provide an interface to the public telecommunications network. With this arrangement, the mobile switching centre 14 may service, via the base station controllers 13 and the base stations 12, over one hundred individual cells 11. Information relating to the mobiles 10a, 10b within the service area of the mobile switching centre 14 is stored in a visitor location register or database 16 associated with the switching centre. When a call to a mobile 10a, 10b is to be set up, the mobile switching centre 14 retrieves from the database 16 a list of those cells in which there is a probability of finding the mobile and initially pages only those cells. If there is no response to this paging message it is assumed that the mobile terminal is not within the predicted group of cells. Further cells may then be paged in order to locate the mobile. The process of cell selection and subsequent paging of the mobile may be defined in the form of an algorithm. In particular we have employed an algorithm based on the following sequence.

1. All active mobiles in the service area of the switching centre register at fixed time intervals, e.g. 30 minutes.

2. Each time a mobile registers, the cell from which the registration message originated is noted in the database as the mobile's last known cell. This information may be updated as a result of other system transactions with the mobile, e.g. call originations, page responses and hand offs.

3. At the time of a mobile termination attempt, based on the mobile's last known cell, identify a paging zone comprising a set of cells in which the mobile is most likely to be found, and page only the cells in the paging zone.

4. If no response is received to the paging of the paging zone after a time interval (typically 1 to 6 seconds), then page the remainder of the service area.

The algorithm incorporates two paging steps and will thus be referred to below as the two step algorithm.

Figure 2:
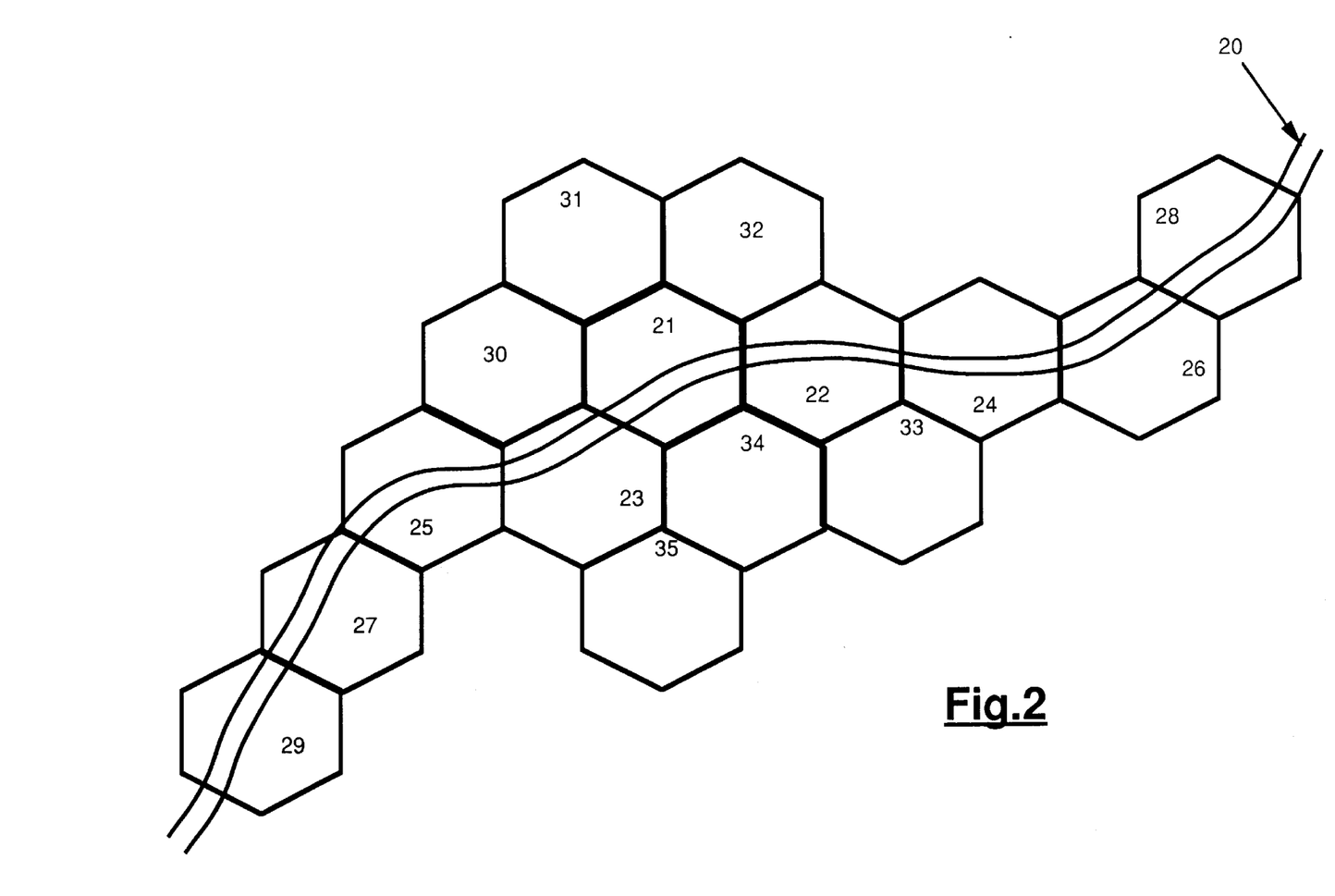
FIG. 2 illustrates a region of the system of FIG. 1 illustrating the definition of a paging zone.

We have found that the use of fixed interval registration by the mobiles allows the computation of an optimal paging zone for any particular mobile. In our system, each mobile registers at regular intervals, typically thirty minutes, and the paging zone is then computed from the registration history of that mobile. Unique paging zones are determined for every possible last known cell of a mobile. Thus, for example, in a system having one hundred cells, one hundred paging zones are defined, each paging zone corresponding to a possible last known cell of a mobile. These paging zones can of course overlap. In particular, we have found that the movement of mobiles is not purely random, as has been assumed in previous attempts to model a cellular system, and that the probability of finding a mobile in each of the cells adjoining the cell in which the mobile last registered is seldom equal. This effect is illustrated in FIG. 2 which illustrates a typical cell cluster arrangement along a highway. If a mobile last registered in cell 21, then at the time of paging, it is more likely to be found in the area covered by cells 21, 22, 23, 24, 25, 26, 27, 28 and 29 than in the area covered for example by cells 21, 22, 23, 30, 31, 32, 33, 34 and 35. Thus the optimum paging zone for each last known cell is not always based on geographical proximity but can vary in size and/or configuration based e.g. on the street layout and the mobility pattern of subscribers.

Figure 3:
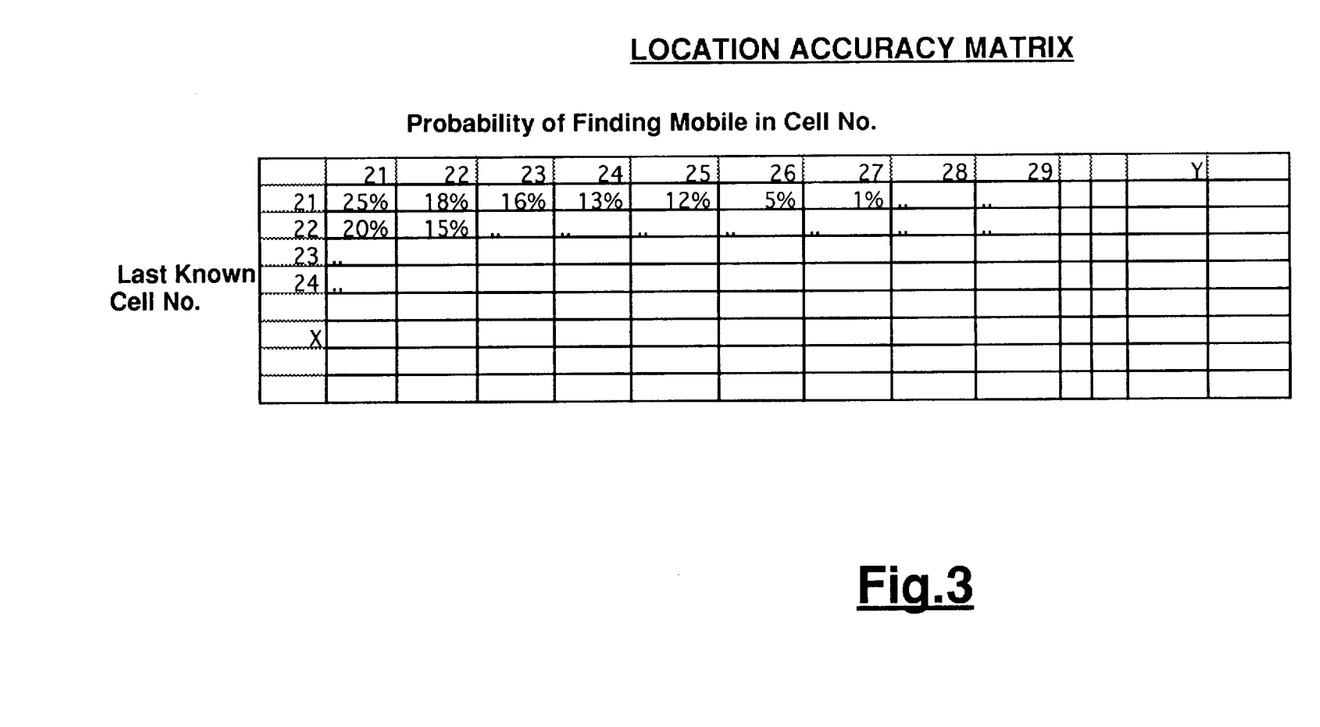
FIG. 3 illustrates the construction of a location accuracy matrix employed in the determination of a paging zone.

In order to set up the optimal paging zones, it is necessary to consider various factors influencing the mobility of subscribers in the service area such as street layout, geographical features, speed limits, etc. Given the last known cell location of a mobile, its probability of being present in another cell of the system at the time of paging is determined by noting the page responses received from each cell and the last known cell of the mobiles that send these responses. This aggregate data is compiled in a table referred to as a Location Accuracy Matrix (LAM) (FIG. 3). The LAM is a large matrix with the number of rows and columns equal to the number of cells in the system. Each row corresponds to a last known cell and each column corresponds to a cell from which page responses are obtained. Every element of the matrix comprises a counter that is incremented in the following manner. Suppose a page response is received from cell Y and the mobile which responded had last registered from cell X. Then, we increment the counter (X,Y) corresponding to row X and column Y of the LAM. So, for every cell X in the system, the corresponding row in the LAM indicates the cells to which the mobile may have travelled since the mobile's last registration which had occurred in cell X. Every cell in that row with a non-zero entry is a possible mobile location and the value of the counter is a reflection of the likelihood of finding the mobile in that cell at the time of paging.

Figure 4:
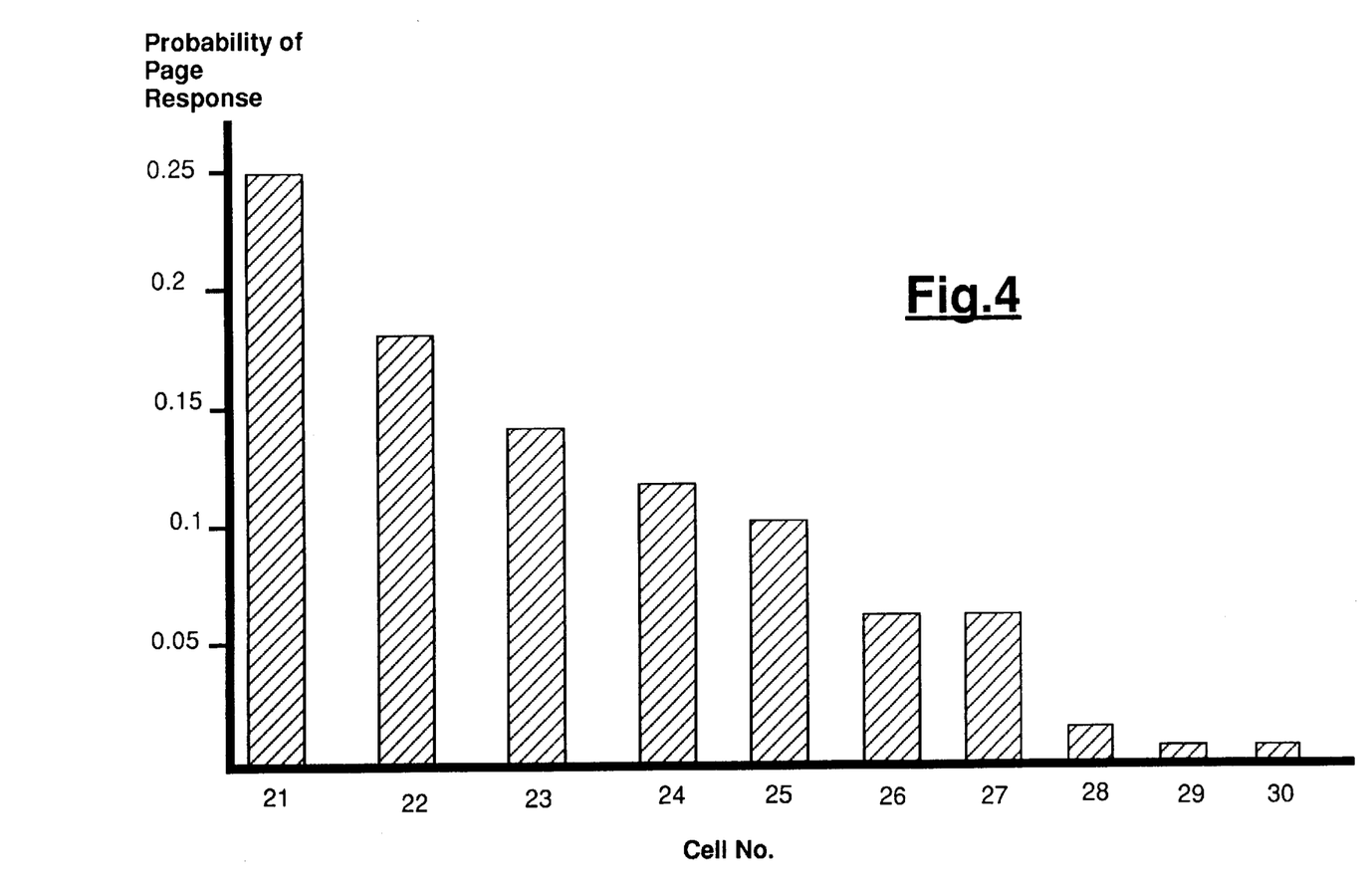
FIG. 4 is a graphical representation of the probability density function of the cellular region of FIG. 2 derived from the location accuracy matrix of FIG. 3.

Once the LAM data is collected, it can be used to compute the average probability of finding a mobile in any cell Y, given that its last known cell is X. For example, suppose that, for those mobiles which have cell 21 as the last known cell, we note that 25% of the page responses are received from cell 21 itself, 18% from cell 22, 16% from cell 23, 13% from cell 24, 12% from cell 25, 5% each from cells 26, and 27, 1% each from cells 28 and 29, 0.5% each from cells 30, 31, 32, 33, 34, 35 and the remaining 1% of the responses are scattered over the rest of the cells in the system, with no cell having more than 0.1% of the responses. From this information, we may conclude that if cell 21 is the last known cell of a mobile, the probability of finding the mobile in cell 21 itself at the time of paging is 0.25, in cell 22 is 0.18, etc. Knowledge of this probability density function, which is illustrated in FIG. 4, can then be used to set up optimal paging zones.

The data regarding page responses may be collected in the LAM for an extended period of time, such as a week. In the span of a week, all the different possible mobility patterns of the subscribers are expected to be manifested and thus represented in our analysis. On the other hand, if we wish to optimise the paging performed by the MSC during the busiest hour of the week, then we may choose to collect the LAM data only for that one hour or perhaps over several instances of that same hour of the week.

This empirical method of computing the expected probability of finding the mobile (at the time of paging) in any cell of the system, given its last known cell, is very effective since it takes into consideration all the various factors that influence mobility of subscribers in the cellular system. We may compute unique paging zones for each individual subscriber or we may take an aggregate approach to computing the probabilities so that no expensive data collection on an individual subscriber basis is done. Alternatively, mobiles can be divided into classes based on their anticipated mobility activity levels. LAM data is then collected and separate paging zones are set up for each class.

In the following sections, we show how these probabilities can be used to compute the optimal paging zones. Even after the paging zones are set up, the LAM data may be collected continually, and if a significant change in the probabilities is noted, the paging zones can be automatically updated. Thus, the paging algorithm is self adjusting and responds to changes in mobility patterns, street layouts and cell layouts over time.

By using the data collected in each row of LAM, we can set up optimal paging zones. The goal is to select those cells in the system that are most likely to have the mobile in their coverage area. As an example, consider the LAM data corresponding to cell 21 being the last known cell (FIG. 3). Assume that the entire service area consists of 100 cells. Although there could indeed be some amount of page responses obtained from each and every cell in the system, the bulk of the page responses would be from a select group of cells, as shown in the example (FIG. 3).

Clearly, it is not worthwhile including cells with very low probabilities in the paging zone. The simplest algorithm for selecting the paging zone would simply be to select an absolute probability value, say p, and include all cells that have a great or equal probability in the paging zone. Thus a suitable algorithm for computing the paging zones is the following sequence of steps.

Algorithm 1:
Begin
   Step 1: Compute the page response probability for every cell in the system, given that cell X is the last known cell of the mobile. This can be done using the LAM data in the row corresponding to cell X.
   Step 2: Include all cells with a page response probability of at least p in the paging zone of cell X.
end:

Let us assume that we decide to include cells with probability of 0.005 or more in the paging zone. Then for cell 21 (FIG. 2), the paging zone would be of size 15 cells (21, 22, 23, 24, 25, 26, 72, 28, 29, 30, 31, 32, 33, 34 and 35. The average probability of the paged mobile being in the paging zone would be 0.99. Then, assuming that the probability of the mobile being active at the time of paging (and hence giving a page response at all) is 0.9 and the probability that a mobile page response will be successfully received by the MSC is 0.95, we find the expected number of cells that would be paged is:

$$15+(1-0.99*0.9*0.95)*(100-15)=15+13.05=28.05 \text{ cells.}$$

Thus, in comparison to system wide paging, which would simply page all one hundred cells, we would have 71.95% reduction in paging activity in comparison with the conventional paging technique.

In an alternative method of computing the paging zones, we have developed an iterative algorithm that includes a cell in the paging zone only if inclusion of that cell in the paging zone would actually reduce the total amount of paging performed. No absolute probability value is used by this method to decide if a particular cell should be included in the paging zone.

First, the algorithm sorts the cells in non-increasing order of probabilities. Then, as it considers each successive cell for inclusion in the paging zone, it computes the expected number of cells that would be paged by the two step algorithm with and without that cell in the paging zone. The cell will be included in the paging zone only if the expected number of cells that would be paged is less with that cell in the paging zone than without.

Assume that cell X is the last known cell and the discrete probability density function corresponding to cell X, in non-increasing order, is $p_1, p_2, p_3, \ldots p_N$ (Assume N cells in the system). Suppose cells, 1, 2, 3, 4, ..., (k−1) are already included in the paging zone, the probability of the mobile being active is r and the probability that a mobile page response will successfully reach the MSC is q. Then the number of cells that will be paged with paging zone of $$\text{size } (k-1) \text{ is: } (k-1) + \left( 1 - rq \sum_{i=1}^{k-1} p_i \right) (N - (k-1))$$

and, with paging zone of size k
would be:

$$k + \left( 1 - rq \sum_{i=1}^{k} p_i \right) (N - k).$$

So, cell k must be included in the paging zone only if:

$$\left( k + \left( 1 - rq \sum_{i=1}^{k} p_i \right)(N-k) \right) - \left( (k-1) + \left( 1 - rq \sum_{i=1}^{k-1} p_i \right)(N-(k-1)) \right) \leq 0.$$

$$\text{i.e.; } p_k \geq \frac{\sum_{i=1}^{k-1} p_i}{(N-k)}.$$

In other words, the minimum probability that a cell must have in order to warrant inclusion into the paging zone is not a constant. It is dependent on the number of cells already in the paging zone (k−1), cumulative of their probabilities $$\left( \sum_{i=1}^{k-1} p_i \right)$$

and the total number of cells in the system (N). Thus, the algorithm for computing optimal paging zones is:

Algorithm 2:

For every cell X in the system do

Begin

Step 1: Compute the page response probability for every cell in the system, given that cell X is the last known cell of the mobile. This can be done using the LAM data in the row corresponding to cell X.

Step 2: Sort the cells in non-increasing order of their probabilities: $p_1, p_2, p_3, \ldots p_N$     Step 3: Set Z=0; P=0

Step 4: For i=1 to N do begin if $$p_i \geq \left( \frac{p}{N-Z-1} \right)$$

then Z=Z+1; P=P+pi;

else break:

end;

Step 5: Include cells 1, 2, 3, . . . Z in the paging zone of cell X. end;

If we were to use Algorithm 2 on the example in FIG. 3, we find that when cell 1 is the last known cell, the paging zone should be 7 cells only (cells 21, 22, 23, 24, 25, 26 and 27). With such a paging zone, the expected number of cells to be pages is, 7+(1−0.94*0.9*0.95)*(100.7)=7+18.26=25.26 cells and the savings over system wide paging is 75.74%. Thus, we see that for the given probability density function, it is sub optimal to include cells 28, 29, 30, 31, 32, 33, 34 and 35 in the paging zone. Cells which are excluded from the paging zone are paged after a 1–3 seconds delay and the call set up time for these mobiles is thus higher than that for those inside the paging zone. On the other hand, if a 15 cell paging zone is used (Algorithm 1), only 1% of the mobiles will experience this delay.

Algorithm 2 generates paging zones of optimal size such that the total paging in the system performed by the two step algorithm is minimised.

Assume for a given last known cell, the optimal paging zone is of six n cells. Then, the n cells must be those with the highest probabilities because if there is a cell X that is not in the paging zone and has a higher probability than another cell Y that is in the paging zone, then simply replacing cell Y with cell X in the paging zone would reduce the total amount of paging in the system. Also, suppose after inclusion of n cells in the paging zone, the next cell, having probability $P_{n+1}$, is not included because it increases the paging in the system. Then, none of the remaining cells would be included also since $p_i \leq p_{n+1}, \forall i, i.n+1$. Inclusion of a set of cells $p_{n+1}, \ldots, p_m$ would also increase paging cost since their average is $\leq p_{n+1}$. Note that Algorithm 2 considers cells in descending order of probability and stops only when there is a cell whose inclusion increases paging. Therefore, Algorithm 2 generates the methodology for computing the paging zones for every last known cell, it generates optimal paging zones for all cells and hence minimises the total paging activity in the system. The time complexity of Algorithm 2 is O(N).

A natural extension of the two step paging algorithm described above is to introduce multiple steps to the paging process. That is, instead of partitioning the cells in the system into two, i.e the paging zone itself and the rest of the service area, we divide the cells into multiple sets: zone 1, zone 2, zone 3, etc. Then, as a first step, page zone 1. If no response is received, page zone 2, followed by zone 3, etc. Obviously, this would increase the savings in paging activity. However, as explained earlier, it would also increase the call set up delay experienced by some calls. Typically in North American cellular systems, call set up is expected to be completed in no more than 10–12 seconds. So, the number of rounds of paging one can perform is limited by this time value.

Assuming we wish to employ a t-step paging algorithm, then Algorithm 3 can be used to partition the N cells in the system (N≧t) into t disjoint sets ($Z_1, Z_2, \ldots Z_t$) such that the total paging performed by the t-step paging algorithm is minimised. First the algorithm sorts the cells in non-increasing order of probabilities. Then, assume at some step of the algorithm, $Z_1$ is of size $k_1$, $\forall i$, $1 \leq i \leq N$.

That is, cells 1, 2, . . . , $k_1$ are in set $Z_1$, cells $k_1+1$, $k_1+2$, . . . , $k_1+k_2$ are in set $Z_2$, etc. Initially, the algorithm sets $k_1=1$ $\forall i$, $1 \leq i \leq t-1$ and $k_t = N-t+1$ $$\text{Let } s_i = \sum_{z_i} p_i, \ m_i = \sum_{j=1}^{i} k_j, \ n_1 = \sum_{j=1}^{i} s_j, \forall i, 1 \leq i \leq t$$

Now, the condition for moving a cell with probability $p_{m1+1}$ from $Z_{1+1}$ to $Z_1$ is:

$$\{k_1 + (1 - rqn_1)k_2 + \ldots + (1 - rqn_{t-1})(k_t + 1) +$$

$$(1 - rqn_t - rqp_{m_{t+1}})(k_{l+1} - 1) + \ldots + (1 - rqn_{t-1})k_t\} -$$

$$\{k_1 + (1 - rqn_1)k_2 + \ldots + (1 - rqn_{t-1}) \ k_t + (1 - rqn_t)k_{l+1} + \ldots +$$

$$(1 - rqn_{t-1})k_t\} \leq 0$$

$$\text{i.e.; } p_{m_t+i} \geq \frac{s_l}{k_{l+1} - 1} .$$

Algorithm 3

For every cell X in the system do

Begin

Step 1 Compute the page response probability for every cell in the system, given that cell X is the last known cell of the mobile. This can be done using the LAM data in the row corresponding to cell X.

Step 2: Sort the cells in non increasing order of their probabilities: $p_1, p_2, p_3, \ldots p_N$,     Step 3: Set $k_i=1$, $\forall i$, $1 \leq i \leq t-1$ and $k_t = N-t+1. s_i = p_i, \forall i$, $1 \leq i \leq t-1$ and $$s_t = \sum_{j=t}^{N} p_j \cdot m_i = i, \forall i, 1 \leq i \leq t-1 \text{ and } m_t = N.$$

Step 4: For i=t to N−1 do begin

For j=t−1 down to 1 do begin

If $$P_{mj+1} \geq \frac{S_j}{k_{j+1} - 1}$$

then
    begin
        $k_j = k_j + 1$;
        $k_{j+1} = k_{j+1} - 1$;
        $s_j = s_j + P_{mj+1}$;
        $s_{j+1} = s_{j+1} - P_{mj+1}$
        $m_j = m_j + P_{mj+1}$;
        $m_{j+1} = m_{j+1} - P_{mj+1}$;
    end;
    else break;
If $j = t-1$, then break;
    end
    Step 5: Include cells 1, 2, . . . $k_1$ in $Z_1$, cells $k_1+1$, $k_1+2$, . . . , $k_1+k_2$ in $Z_2$, etc. .
    end;

Any partitioning of cells into zones $Z_1, Z_2, \ldots, Z_t$, is optimal for a t-step paging algorithm ($t \leq N$) if and only if the cells in $Z_1, Z_2, \ldots, Z_t$, are in non-increasing order of probability (left to right) and the condition for moving a cell from one zone into another is not met for any two adjacent zones.

Algorithm 3 generates paging zones of optimal size such that the total paging in the system performed by the t-step algorithm ($t \leq N$) is minimised.

Algorithm 3 produces zones $Z_1, Z_2, \ldots, Z_1$ in which the cells are in non-increasing order of probability (left to right) and the condition for moving a cell from one zone into another is not met for any two adjacent zones. Algorithm 3 clearly satisfies the first condition since the algorithm first sorts all the cells in non-increasing order of probability and then in step 5, allocation to $Z_1, Z_2, \ldots, Z_1$ is made in order Note that in order for $Z_1, Z_2, \ldots, Z_1$ to be optimal. $\forall i, 1 \leq i \leq t, Z_i \geq 1$ because, if any of the zones $Z_i$ is empty, then the paging cost can be decreased by simply moving the cell with least probability in $Z_{i-1}$ to $Z_i$. So, after initialising $Z_1, Z_2, \ldots, Z_{t-1}$ to $Z_t$ to one cell each and $Z_t$ to the remaining $N-t+1$ cells, the condition for moving a cell from one zone to another can only be met between zones $Z_t$ and $Z_{t-1}$. If the condition is met and we move a cell then there would subsequently also be a possibility of moving a cell (only the cell with highest probability) from $Z_{t1}$ to $Z_{t-2}$, etc. Every time the execution of the inner loop of Step 4 is completed however, once again, the condition for moving a cell from one zone into another is not met for any two adjacent zones. Therefore Algorithm 3 generates optimal paging zones for all cells and hence minimises the total paging activity in the system. The time complexity of Algorithm 3 is 0(Nt).

A system of N cells, at the limit, could be partitioned into N paging zones. With such a paging algorithm, the cost of paging would be:

$$-rq \sum_{i=1}^{N} ((N-i+1)p_i).$$

This gives an upper bound on the savings any multiple step paging algorithm can deliver. For the example in FIG. 3, the expected number of cells to be paged with a 100-step algorithm will be 17.42, a reduction of 82.58%. By comparison, the two step paging algorithm itself gave 75.74% reduction. So, in this case, we would receive only marginal benefit from a multiple step paging algorithm. In general, the reduction from using multiple zones would depend on the specific probability density function under consideration.

In this section we present one such variation and explain the trade offs involved in setting up the optimal paging zones.

Suppose we include the cells in the paging zone also in the second paging step. This is justifiable because, even if the mobile is present in the paging zone, it may not have received the page or if it has received the page and responded, the page response may not have reached the MSC due to RF disturbances. In fact, field trials have shown that when a mobile is paged twice, in some systems, page responses are received on the second attempt a small percentage of the time. Since the mobile is most likely to be in the paging zone (in our example, 0.94 probability) it may be well worthwhile to repage the zone.

In such a case, the condition for inclusion of cell k in the paging zone will be:

$$\left( k + 1 \left( 1 - rq \sum_{i=1}^{k} P_i \right)(N) \right) - \left( (k-1) + \left( 1 - rq \sum_{i=1}^{k-1} P_i \right)(N) \right) \leq 0.$$

i.e., $p_k \geq \frac{1}{Nrq}$ .

Using this condition on our example, with q=0.95, we find the optimal paging zone size is 7 cells (21,22,23,24,25,26 and 27) and the expected number of cells to be paged is:

7+(1−0.94*0.9*0.95)*(100)=7+19.63=26.63 cells.

On the other hand, if repage were to be employed with system wide paging, all the cells are initially paged and if no response is received, all the cells would have to be paged again. Hence expected number of cells to be paged is, 100+(1−0.9*0.95*1.0)(100)=114.5 cells.

So, in comparison to system wide paging, we have a paging reduction of 76.7%.

For this algorithm, the condition for inclusion of cells in the paging zone is independent of the number of cells already included in the zone or their cumulative probabilities. So, Algorithm 1 could be used to compute the optimal paging zones with $$p = \frac{1}{Nrq} .$$

However, note that we are not repaging the cells outside of the paging zone. So, in comparison to system wide paging, there is a loss of 0.3% page responses. (Only 94% page responses are covered by the paging zone. So, 5% page loss over the remaining 6% would be 0.3%). Thus, there is a trade off between potential degradation in the grade of service due to page response loss and gains in capacity due to reducing paging activity.

One approach to handling this trade off would be to attach a cost of C units for each lost page response. (Where 1 unit is the real time cost of paging one cell). Then cell k must be included in the paging zone only if:

$$\left(k + \left(1 - rq \sum_{i=1}^{k} p_i\right)N + \right.$$

$$(1-q)\left(1 - \sum_{i=1}^{k} p_i\right)C\right) - \left((k-1) + \left(1 - rq \sum_{i=1}^{k-1} p_i\right)N +$$

$$(1-q)\left(1 - \sum_{i=1}^{k-1} p_i\right)C\right) \leq 0$$

i.e.; $p_k \geq \dfrac{1}{Nrq + (1-q)C}$

If $C=2500$, then $p=0.00475$ and in our example, the optimal paging zone is 15 cells and the expected paging activity is, $15+(1-0.9*0.95*0.99)(100)=15+15.36=30.36$ cells.

The reduction in paging is 69.64% and the loss of page responses would be only 0.05%. Obviously as $C \to \infty, p \to 0$. That is, if an extremely high premium is placed on preventing page response loss, we would have to simply resort to including more cells in the paging zone. In such a case, rather than increase the size of the paging zone, it may be wiser to resort to repaging the rest of the system also by employing the following three step algorithm.

Three step paging algorithm:
Step 1: Page the cells in the paging zone.
Step 2: If no response is received from the paging zone, then page all the cells in the system (including the cells in the paging zone).
Step 3: If still no response is received, repage all the cells not in the paging zone.

Here, cell k must be included in the paging zone only if:

$$\left\{k + \left(1 - rq \sum_{i=1}^{k} p_i\right)N + \right.$$

$$\left(1 - r \sum_{i=1}^{k} p_i - rq\left(1 - \sum_{i=1}^{k} p_i\right)\right)(N-k)\right\} -$$

$$\left\{(k-1) + \left(1 - rq \sum_{i=1}^{k-1} p_i\right)N + \right.$$

$$\left(1 - r \sum_{i=1}^{k-1} p_i - rq\left(1 - \sum_{i=1}^{k-1} p_i\right)\right)(N-k)\right\} \leq 0$$

i.e.; $p_k \geq \dfrac{\left((1-q)\sum_{i=1}^{k-1} p_i\right) + q}{N - (1-q)k}$

So, for a given value of C, one could compute the paging cost of both these methods and choose the one that reduces paging the most. Note, however, that the three step algorithm further increases the call set up delay for a small fraction of the calls.

In the paging algorithms described above, for each last known cell of the mobile, we optimally partition the system into two or more paging zones. Every cell in the system is in some zone. So, in the t-step ($t \geq 2$) paging algorithm, every cell in the system would be eventually paged unless a page response is received early. Due to this reason, the grade of service is equal or very close to system wide paging.

In some instances, particularly in systems with low mobility, we may find that in every row of the LAM, there are several zero entries. i.e., for a given last known cell, no page responses have been received from these cells at all during the time period the LAM data has been collected. So, one could eliminate these cells entirely from the paging algorithm, and instead of paging the entire system, page only the cells with non-zero entries in the LAM.

The simplest approach would be to include all cells with non-zero LAM entries in the paging zone and then page the zone only. No second paging step is necessary. However, more savings in paging can be obtained if we divide these cells with non-zero page responses into two or more zones and page them in sequence as described in the algorithm given in above. Also, the option of repaging the zone may be considered as explained above.

Algorithm 1, 2 & 3 could still be used to set up the optimal size of these zones, only now, set N=non-zero entries in the LAM. Of course, this policy of not paging all the cells in the system may mean that if system mobility patterns vary over time, then some mobile terminations would be missed.

Another approach would be to use the t-step ($t \geq 2$) paging algorithm, but when the MSC or the peripherals (such as base stations) are in overload condition, only the first step of the paging algorithm is performed, thus reducing the paging cost in the system. This is an effective overload control strategy since the mobile is most likely to be in the initial paging zone, and thereafter subsequent rounds of paging give diminishing returns.

We claim:

1. A method of paging a mobile terminal in a cellular communications system comprising a plurality of cells in each of which mobile terminals currently located therein may be serviced by a respective base station, base station controllers each controlling a respective group of base stations, and a mobile switching centre controlling said base station controllers, wherein the method comprises the steps of;

providing at a central store associated with the mobile switching centre a cell location record of each mobile terminal at regular intervals, said record comprising the present cell location and a number of previous cell locations of the mobile terminal;

determining from the location record of each said mobile terminal a pattern of movement of that terminal within the mobile system;

predicting, from the present cell location in which a mobile terminal to be paged was last recorded and from the pattern of movement for that terminal determined from its recorded present and previous cell locations, a paging zone consisting of a group of cell within which there is a significant probability of finding the mobile terminal;

transmitting a first paging message for that terminal to the group of cells comprising said paging zone via the respective base station controller(s) and base station(s) so as to page the mobile terminal in each cell of said paging zone;

determining whether the mobile terminal has responded to the first paging message and transmitting at least one repeat paging message for that terminal to further system cells in response to a determination that the mobile terminal has not responded to said first paging message.

2. A method as claimed in claim 1, the method including determining for each system cell the probability of finding in that cell a mobile terminal whose location was last recorded in that cell, and wherein the predicted group of cells comprises those cells for which the probability of finding the mobile terminal therein exceeds a predetermined minimum value.

3. A method as claimed in claim 2, the method including determining those cells having a zero probability of containing the mobile terminal to be paged and excluding those cells from the repeat paging message transmission.

4. A method as claimed in claim 1, the method including determining for each system cell the probability of finding in that cell and each other system cell a mobile terminal most recently recorded in that cell, determining for each system cell the expected paging workload resulting from inclusion of that cell in the predicted group of cells, and incorporating that cell in the predicted group of cells only if the inclusion of that cell in the group results in a reduction of the paging workload.

5. A method as claimed in claim 2, wherein said system cells are allocated into groups by order of decreasing probability of containing the mobile terminal to be paged, wherein the cells of the group having the highest probability is paged by the first paging message, and wherein the groups of cells of lower probability are paged repeat paging messages in order of decreasing probability if no response is received from the mobile terminal to a previous paging message.

6. A method as claimed in claim 1, wherein the repeat page message is transmitted both to the further cells and to the predicted group of cells.

7. A method as claimed in claim 5, wherein a further repeat paging message is transmitted to all said cells if no response has been received to said paging message and to said repeat paging message.

8. A cellular communications system comprising a plurality of cells in each of which cells mobile terminals currently located therein may be serviced by a respective base station, base station controllers each controlling a respective group of said base stations, a mobile switching centre controlling said base station controllers, storage means associated with the mobile switching centre for recording and storing a cell location record of each mobile terminal at regular intervals, said record comprising the present cell location and a number of previous cell locations of the mobile terminal, prediction means for determining from the stored location record of each said mobile terminal to be paged a pattern of movement of that terminal within the mobile system and for predicting, from the present cell location in which the mobile terminal to be paged was last recorded and from the determined pattern of movement for that terminal a paging zone consisting of a group of cell within which there is a significant probability of finding the mobile terminal; paging message transmission means for transmitting a first paging message for that mobile terminal from the mobile switching centre via the respective base station controller(s) and base station(s) to the group of cells comprising said paging zone so as to page the mobile terminal in each cell of the paging zone; and means for determining whether the mobile terminal has responded to the first paging message and for transmitting at least one repeat paging message for that terminal to further system cells in response to a determination that the mobile terminal has not responded to said first paging message.

9. A cellular mobile communications system as claimed in claim 8, wherein said predicting means comprises means for determining for each system cell from said location recordal a respective group of cells in which a mobile terminal last recorded in that cell is expected to be located.

10. A cellular communications system as claimed in claim 9, including means for determining for each system cell the probability of finding in that cell a mobile terminal whose location was last recorded in that cell, and means for including in the predicted group of cells for a terminal to be paged those cells for which the probability of finding the mobile terminal therein exceeds a predetermined minimum value.

11. A method as claimed in claim 8, and including means for determining for each system cell the expected paging workload resulting from inclusion of that cell in the predicted group of cells, and means for incorporating that cell in the predicted group of cells only if the inclusion of that cell in the group results in a reduction of the paging workload.

* * * * *